US010370480B2

(12) United States Patent
Bokern et al.

(10) Patent No.: US 10,370,480 B2
(45) Date of Patent: Aug. 6, 2019

(54) AGING-RESISTANT POLYURETHANE SEAL

(71) Applicant: BASF SE, Ludwigshafen (DE)

(72) Inventors: Stefan Bokern, Bremen (DE); Pierre Coppens, Heusden (BE); Patrick Bolze, Osnabrueck (DE); Thomas Mathieu, Lemfoerde (DE); Carola Melloh, Brockum (DE)

(73) Assignee: BASF SE, Ludwigshafen (DE)

( * ) Notice: Subject to any disclaimer, the term of this patent is extended or adjusted under 35 U.S.C. 154(b) by 203 days.

(21) Appl. No.: 15/506,916

(22) PCT Filed: Jul. 29, 2015

(86) PCT No.: PCT/EP2015/067346
§ 371 (c)(1),
(2) Date: Feb. 27, 2017

(87) PCT Pub. No.: WO2016/030111
PCT Pub. Date: Mar. 3, 2016

(65) Prior Publication Data
US 2017/0260320 A1    Sep. 14, 2017

(30) Foreign Application Priority Data
Aug. 28, 2014   (EP) ..................................... 14182711

(51) Int. Cl.
| C08G 18/66 | (2006.01) |
| C08G 18/48 | (2006.01) |
| C08G 18/50 | (2006.01) |
| C08G 18/72 | (2006.01) |
| C08G 18/75 | (2006.01) |
| C08G 18/79 | (2006.01) |
| C08G 18/16 | (2006.01) |
| C08G 18/20 | (2006.01) |
| C08G 18/24 | (2006.01) |
| C08G 18/32 | (2006.01) |
| C08G 18/36 | (2006.01) |
| C08G 18/18 | (2006.01) |
| C08G 18/34 | (2006.01) |

(52) U.S. Cl.
CPC ....... *C08G 18/6696* (2013.01); *C08G 18/165* (2013.01); *C08G 18/18* (2013.01); *C08G 18/20* (2013.01); *C08G 18/246* (2013.01); *C08G 18/3275* (2013.01); *C08G 18/341* (2013.01); *C08G 18/36* (2013.01); *C08G 18/482* (2013.01); *C08G 18/4812* (2013.01); *C08G 18/4829* (2013.01); *C08G 18/4837* (2013.01); *C08G 18/4845* (2013.01); *C08G 18/5024* (2013.01); *C08G 18/722* (2013.01); *C08G 18/755* (2013.01); *C08G 18/792* (2013.01); *C08G 2190/00* (2013.01)

(58) Field of Classification Search
CPC ...... C08G 18/165; C08G 18/18; C08G 18/20; C08G 18/246; C08G 18/3275; C08G 18/341; C08G 18/36; C08G 18/4812; C08G 18/482; C08G 18/4829; C08G 18/4837; C08G 18/4845; C08G 18/5024; C08G 18/6696; C08G 18/722; C08G 18/755; C08G 18/792; C08G 2190/00

See application file for complete search history.

(56) References Cited

U.S. PATENT DOCUMENTS

| 3,304,273 A | | 2/1967 | Stamberger | |
| 3,383,351 A | | 5/1968 | Stamberger | |
| 3,523,093 A | | 8/1970 | Stamberger | |
| 5,621,043 A | * | 4/1997 | Croft ................. | C08G 18/4045 524/710 |
| 6,452,003 B1 | * | 9/2002 | Ewald ................. | C08G 18/022 252/182.2 |
| 2005/0054764 A1 | | 3/2005 | Zhou et al. | |
| 2013/0253084 A1 | * | 9/2013 | Duggal ................ | C08G 18/10 521/124 |
| 2017/0096518 A1 | * | 4/2017 | Hernandez Garcia .... | B32B 7/04 |

FOREIGN PATENT DOCUMENTS

| DE | 111394 C | 7/1899 |
| DE | 1 152 536 B | 8/1963 |
| DE | 1 152 537 B | 8/1963 |

(Continued)

OTHER PUBLICATIONS

International Search Report issued in PCT/EP2015/067346 dated Oct. 13, 2015.
International Preliminary Report on Patentability for PCT Patent Application No. PCT/EP2015/067346, dated Mar. 9, 201.
Extended European Search Report for EP Patent Application No. 14182711.3, dated Feb. 24, 2015, 4.

Primary Examiner — John M Cooney
(74) Attorney, Agent, or Firm — Armstrong Teasdale LLP

(57) ABSTRACT

The invention relates to a method for producing seals made of polyurethane, in which (a) aliphatic polyisocyanate, (b) compounds containing at least two isocyanate-reactive groups, (c) catalysts, (d) antioxidants and/or light stabilizers, and, optionally, (e) blowing agents, and (f) auxiliary agents and/or additives are mixed to form a reaction mixture, and the reaction mixture is allowed to complete the reaction to form polyurethane. The seal made of polyurethane has a Shore A hardness of less than 90 and a density of at least 850 g/L. The polymeric compounds having groups reactive toward isocyanate include b1) polyetherols having a functionality of 2 to 4 and a hydroxyl number of 20 to 100 mg KOH/g, b2) hydrophobic polyols having an OH number of less than 180 mg KOH/g and a functionality of greater than 2 to 3, and b3) chain extenders.

15 Claims, No Drawings

(56) References Cited

FOREIGN PATENT DOCUMENTS

| | | |
|---|---|---|
| EP | 0090444 A2 | 10/1983 |
| EP | 0 676 432 A1 | 10/1995 |
| EP | 0929561 A4 | 3/2000 |
| EP | 1577080 A1 | 9/2005 |
| EP | 2 157 109 A1 | 2/2010 |
| WO | 9814457 A1 | 4/1998 |
| WO | 05/090440 A1 | 9/2005 |
| WO | 2008055952 A1 | 5/2008 |
| WO | 2009128279 A1 | 10/2009 |

* cited by examiner

AGING-RESISTANT POLYURETHANE SEAL

CROSS-REFERENCE TO RELATED APPLICATIONS

This application is a U.S. National Phase Application of PCT/EP2015/067346, filed Jul. 29, 2015, which claims the benefit of priority to EP 14182711.3, filed Aug. 28, 2014, the contents of which are hereby expressly incorporated by reference in their entirety.

The present invention relates to a process for the production of polyurethane gaskets by mixing (a) aliphatic polyisocyanate, (b) compounds having at least two groups reactive toward isocyanates, (c) catalysts, (d) antioxidants and/or light stabilizers, and optionally (e) blowing agents, and (f) auxiliaries and/or additional substances to give a reaction mixture, and allowing completion of the reaction mixture to give the polyurethane, where the Shore A hardness of the polyurethane gasket is smaller than 90 and its density is at least 850 g/L, and the polymeric compounds having groups reactive toward isocyanate comprise b1) polyetherols with functionality from 2 to 4 and with hydroxy number from 20 to 100 mg KOH/g, b2) hydrophobic polyols with OH number smaller than 180 mg KOH/g and with functionality from greater than 2 to 3, and b3) chain extenders. The present invention further relates to a polyurethane gasket obtainable by this process, and also to the use of this gasket in contact with rubber.

A feature of polyurethanes is versatility. The wide variety of properties of these materials leads to their frequent use in particular in automobile construction. Polyurethanes used in the automobile sector are subject to stringent requirements: excellent mechanical properties that do not change over the lifetime of the automobile are required, the aim here being that the polyurethanes retain their function in everyday use relevant to the application sector, for example service properties, esthetic properties, haptic properties, or stabilization properties. Polyurethanes for automobile applications have exposure to extreme climatic conditions, for example insolation, moisture, and extreme temperatures in the range from less than −10° C. up to 100° C., accelerating the aging of the polyurethane.

These extreme conditions lead to homolytic bond cleavage, oxidative stress, or hydrolysis. These result in undesired effects such as impairment of mechanical properties, embrittlement of the material, and cracking. Another factor that can also lead to undesired impairment of the properties of the materials, alongside adverse climatic conditions, is interaction with other materials that are used together with the polyurethanes. This impairment can be caused by stresses due to different coefficients of thermal expansion, or in the event of interaction with other synthetic polymers it can be caused by the disadvantageous effect of substances that migrate into the materials, an example being plasticizers or catalyst residues that lead to embrittlement and to undesired softening in the polyurethane material.

Polyurethanes based on polyester polyols exhibit markedly better resistance to oxidative degradation, but because of degradation due to hydrolysis of the ester group are unsuitable for applications in contact with wet or damp conditions of the type frequently arising in automobiles and in particular in external applications on automobiles, examples being gasket applications such as those for glazing. Polyurethane gaskets here are in particular required to have high weathering resistance.

For external automobile applications preference is given to use of polyether polyols and of aromatic isocyanates such as MDI, but these exhibit accelerated breakdown of the material under UV light, because of the UV adsorption of MDI. Resistance to light can be improved by using aliphatic isocyanate such as IPDI, HDI, or H12MDI for external applications with high UV exposure, instead of aromatic isocyanate. These systems are described by way of example in EP 929561.

Although systems according to EP 929561 exhibit good weathering resistance, for example hydrolysis resistance and UV resistance, they are susceptible to embrittlement in contact with synthetic polymers, in particular synthetic polymers comprising plasticizer, an example being rubber such as ethylene-propylene-diene rubber (EPDM).

It was an object of the present invention to provide polyurethane systems which, even when in contact with other polymers, have high weathering resistance and are suitable for internal and external use in vehicles, for example for the sealing of glazing.

Said object has been achieved via a polyurethane gasket which can be produced by a process where (a) aliphatic polyisocyanate, (b) compounds having at least two groups reactive toward isocyanates, (c) catalysts, (d) antioxidants and/or light stabilizers, and optionally (e) blowing agents, and (f) auxiliaries and/or additional substances are mixed to give a reaction mixture, and the reaction mixture is allowed to complete a reaction to give the polyurethane, where the Shore A hardness of the polyurethane gasket is smaller than 90 and its density is at least 850 g/L, and the polymeric compounds having groups reactive toward isocyanate comprise b1) polyetherols with functionality from 2 to 4 and with hydroxy number from 20 to 100 mg KOH/g, b2) hydrophobic polyols with OH number smaller than 180 mg KOH/g and with functionality from greater than 2 to 3, and b3) chain extenders.

In particular, materials involved here are preferably polyurethanes of density at least 850 g/L, preferably from 900 to 1500 g/L, and particularly preferably from 950 to 1350 g/L. Preference is further given to unfoamed polyurethanes. An unfoamed polyurethane here is in essence obtained without addition of a blowing agent. Small quantities of blowing agent, for example water, comprised in the polyols as a result of a production process, are not counted as blowing agent here. The reaction mixture for the production of the compact polyurethane preferably comprises less than 0.2% by weight of water, particularly preferably less than 0.1% by weight, and in particular less than 0.05% by weight. The hardness of the polyurethane gasket of the invention is moreover less than 90 Shore A, preferably from 40 to 88 Shore A, and in particular from 60 to 86 Shore A. These soft polyurethanes have particular suitability as gaskets in the automobile sector, in particular in glass glazing systems, since they provide good conformability of the material to the areas requiring sealing, without any need for excessively high pressure.

Isocyanates (a) that can be used are any aliphatic or cycloaliphatic polyisocyanates, preferably diisocyanates. Individual examples that may be mentioned are: aliphatic diisocyanates such as hexamethylene 1,6-diisocyanate or 2-methylpentamethylene 1,5-diisocyanate, and cycloaliphatic diisocyanates such as isophorone diisocyanate or cyclohexane 1,4-diisocyanate.

The isocyanates (a) are preferably not, or not entirely, used in their monomeric form, and preferably comprise isocyanate prepolymers, uretdiones, isocyanurates, allophanates, or biurets. These isocyanates are known and can be purchased. The isocyanates preferably comprise isocyanurates, which are obtained via trimerization of diisocyanates, and which have three isocyanate groups. The use of isocyanurates thus provides crosslinking in the resultant polyurethane. In particular, isocyanurates of isophorone diisocyanates are used as polyisocyanates (a) for the purposes of the present invention. In one particularly preferred embodiment the isocyanates (a) comprise monomeric and trimeric isocyanurate of isophorone diisocyanate. The NCO content of the isocyanate (a) here is preferably from 24.4 to 34, particularly preferably from 26 to 32. It is preferable that the isocyanates (a) comprise, alongside isophorone diisocyanate and isophorone isocyanurate, less than 30% by weight of other isocyanates, particularly preferably less than 15% by weight and in particular less than 5% by weight. Any of the isocyanates mentioned under (a) can be used here as other isocyanates, and in particular prepolymers of isophorone diisocyanate are used as other isocyanates.

Polyisocyanate prepolymers are obtainable by reacting polyisocyanates described above (constituent (a-1)) in excess with compounds (constituent (a-2)) (b) having groups reactive toward isocyanates, by way of example at temperatures of from 30 to 100° C., preferably at about 80° C., to give the isocyanate prepolymer.

Polymeric compounds (a-2) having groups reactive toward isocyanates, and chain extenders (a-3) are known to the person skilled in the art and are described by way of example in "Kunststoffhandbuch, 7, Polyurethane" [Plastics handbook, 7, Polyurethanes], Carl Hanser-Verlag, 3rd edition 1993, chapter 3.1. Polymeric compounds (a-2) having groups reactive toward isocyanates can by way of example also be the polymeric compounds described below under (b) having groups reactive toward isocyanates.

Compounds (b) used having groups reactive toward isocyanates can be any known compounds having at least two hydrogen atoms reactive toward isocyanates, for example those with functionality from 2 to 8 and with number-average molar mass from 400 to 15 000 g/mol. It is possible by way of example to use compounds selected from the group of the polyether polyols, polyester polyols, and mixtures thereof.

Polyetherols are by way of example produced from epoxides such as propylene oxide and/or ethylene oxide, or from tetrahydrofuran, by using starter compounds comprising active hydrogen, for example aliphatic alcohols, phenols, amines, carboxylic acids, water, or compounds based on natural materials, for example sucrose, sorbitol, or mannitol, and a catalyst. Mention may be made here of basic catalysts and double metal cyanide catalysts, as described by way of example in PCT/EP2005/010124, EP 90444, or WO 05/090440.

Polyesterols are by way of example produced from aliphatic or aromatic dicarboxylic acids and from polyhydric alcohols, polythioether polyols, polyesteramides, hydroxylated polyacetals, and/or hydroxylated aliphatic polycarbonates, preferably in the presence of an esterification catalyst. Other possible polyols are mentioned by way of example in "Kunststoffhandbuch, 7, Polyurethane" [Plastics handbook, 7, Polyurethanes], Carl Hanser-Verlag, 3rd edition 1993, chapter 3.1.

Other materials that can be used, alongside the polyetherols and polyesterols described, are filled polyetherols or polyesterols, also termed polymer polyetherols or polymer polyesterols. These compounds preferably comprise dispersed particles made of thermoplastics by way of example composed of olefinic monomers such as acrylonitrile, styrene, (meth)acrylates, (meth)acrylic acid, and/or acrylamide. These filled polyols are known and are obtainable commercially. The production thereof is described by way of example in DE 111 394, U.S. Pat. Nos. 3,304,273, 3,383,351, 3,523,093, DE 1 152 536, DE 1 152 537, WO 2008/055952, and WO2009/128279.

The compounds having at least two groups reactive toward isocyanate moreover comprise chain extenders and crosslinking agents. Compounds that can be used as chain extenders and crosslinking agents have at least two groups reactive toward isocyanates and molar mass less than 400 g/mol, the term chain extender being used here for molecules having two hydrogen atoms reactive toward isocyanate, and the term crosslinking agent being used here for molecules having more than two hydrogen atoms reactive toward isocyanate.

Component (b) here comprises polyetherols b1) with functionality from 2 to 4 and with hydroxy number from 20 to 100 mg KOH/g, hydrophobic polyols b2) with OH number smaller than 180 mg KOH/g and with functionality from greater than 2 to 3, and chain extenders b3).

Polyetherols b1) used are preferably polyetherols that can be produced by an addition reaction, known per se, of alkylene oxides onto compounds which have at least two hydrogen atoms reactive toward alkylene oxides. By way of example, the polyetherols b1) are produced by anionic polymerization of alkylene oxides with alkali metal hydroxides as catalysts and with addition of a starter molecule which has a plurality of reactive hydrogen atoms. Alkylene oxides used can be one or more compounds selected from propylene oxide (PO) and ethylene oxide (EO), butylene oxide, and tetrahydrofuran. Examples of compounds serving as starter molecules are dihydric alcohols such as ethylene glycol, propylene glycol, or butanediols, trihydric alcohols such as glycerol or trimethylolpropane, and also polyhydric alcohols such as pentaerythritol, sugar alcohols such as sucrose, glucose, or sorbitol, and also aromatic diols such as bisphenol A, bisphenol F, or bisphenol S. The selection of the starter molecules here is such that the average functionality of the resultant polyetherol b1) is from 2 to 4, preferably from 2.2 to 3.0, and in particular form 2.5 to 2.9. It is preferable that starter molecules used are trifunctional compounds, particularly trimethylolpropane or glycerol, and in particular glycerol.

Alkylene oxide used is preferably a mixture of ethylene oxide and/or propylene oxide. It is preferable that the quantitative proportions in which the alkylene oxides are used here is such that the proportion of ethylene oxide is smaller than 30% by weight, particularly from 1 to 20% by weight, and in particular from 5 to 15% by weight, based on the total weight of the alkylene oxide used for the production of the polyetherol b1). In particular, no alkylene oxide other than ethylene oxide and propylene oxide is used. The content of primary OH groups in the polyetherol b1) here is preferably greater than 40%, particularly preferably from 70 to 100%, and in particular from 75 to 95%. The proportion of the primary OH groups here can be controlled via the sequence of addition of the alkylene oxide; ethylene oxide leads to primary OH groups in the polyetherol here, and propylene oxide to secondary OH groups. The hydroxy number of the polyetherol b1) is from 20 to 100 mg KOH/g and preferably from 25 to 50 mg KOH/g.

Polyol b2) used is a polyol with OH number smaller than 180 mg KOH/g, preferably from 50 to 160 mg KOH/g, and in particular from 100 to 155 mg KOH/g, and with functionality from greater than 2 to 3, preferably from 2.05 to 2.8, particularly preferably from 2.05 to 2.7, and in particular from 2.1 to 2.5. It is preferable that the polyol b2) is hydrophobic, i.e. that it comprises a molecular moiety having at least five hydrocarbon groups in succession. It is particularly preferable that the polyol b2) is fatty-acid-based, i.e. that the polyol b2) comprises the reaction product of a carboxylic acid having from 7 to 50, preferably from 9 to 30, carbon atoms, where said acid is branched or linear, saturated or unsaturated, and substituted or unsubstituted, with polyhydric alcohols, preferably with glycerol. The reaction with the fatty acid here can have esterified all or some of the OH groups of the polyhydric alcohol.

It is preferable that polyol b2) used is castor oil, or particularly reaction products of natural oils, where the hydroxy number, and the functionality, is established by way of example via hydration of double bonds, alkoxylation of OH groups, and/or dehydration. Alkoxylation here is achieved by the process described for polyol b1).

It is particularly preferable that polyol b2) used is partially dehydrated castor oil. Elimination of water is usually achieved here in the presence of acidic catalysts such as sulfuric acid, phosphoric acid, anhydrides, and/or acidic metal oxides, and leads to a second double bond, mostly produced as a conjugated bond between $C_{11}$ and $C_{12}$. The ester groups relating to the glycerol are retained here. Various qualities are produced in accordance with reaction conditions and time, and these differ primarily in terms of viscosity by virtue of onset of polymerization during the process. Partially dehydrated castor oil is obtainable commercially by way of example as Sovermol® 1005 from BASF SE, and is particularly preferred as polyol b2).

Chain extenders b3) used are compounds which have two aliphatically bonded OH groups and molar mass less than 160 g/mol, preferably from 62 to 140 g/mol, and in particular from 62 to 100 g/mol. It is preferable that the proportion of the primary OH groups here is at least 50%.

Examples of chain extenders b2) are monoethylene glycol, propylene 1,3-glycol, propylene 1,2-glycol, and 1,4-butanediol. Monoethylene glycol is particularly preferred as chain extender b3).

The compounds (b) having groups reactive toward isocyanates can moreover comprise, alongside the compounds b1) to b3), compounds (b4) with molar mass smaller than 150 g/mol, with average functionality from 2 to 3 and, as groups having functionality toward isocyanate, functional groups selected from —$NH_2$, —NH—, and —OH groups, where at least one of the functional groups is an —$NH_2$ group or an —NH— group. It is preferable to use diethanolamine as compound b4).

The compounds (b) having groups reactive toward isocyanates can moreover comprise, alongside the compounds (b1) to (b3), and optionally (b4), compounds (b5) with molar mass from 800 to 6000 g/mol, preferably from 1500 to 2500 g/mol, with functionality from 2 to 4, preferably from 2 to 3, and particularly preferably 2, where groups used having the functionality toward isocyanate are functional groups selected from —$NH_2$, —NH—, and —OH groups, and at least one of the functional groups is an $NH_2$ group. It is preferable that both of the functional groups are $NH_2$ groups. It is particularly preferable to use, as component b5), aminated alkylene oxide based on difunctional starter molecules, where the alkylene oxide is in particular propylene oxide.

It is moreover preferable that the compound (b) having at least two groups reactive toward isocyanates also comprises, alongside the components (b1) to (b3), and optionally (b4) and (b5), compounds (b6) with molar mass smaller than 400, particularly preferably from 92 to 300 g/mol, and in particular from 92 to 200 g/mol, and with hydroxy functionality from 3 to 6, preferably having from 3 to 4 OH groups, and in particular having 3 OH groups. Examples of compounds (b6) are glycerol, trimethylolpropane, and alkoxylated glycerol, and alkoxylated trimethylolpropane, where ethylene oxide is preferably used as alkylene oxide. In particular, glycerol is preferred as component (b6).

The proportion of component b1) here is preferably from 50 to 90% by weight, particularly preferably from 55 to 80% by weight, the proportion of component b2) here is from 5 to 25% by weight, preferably from 8 to 19% by weight, particularly preferably from 8 to 15% by weight, the proportion of component b3) here is from 1 to 7% by weight, preferably from 3 to 6% by weight, the proportion of component b4) here is from 0 to 5% by weight, preferably from 1 to 5% by weight, and the proportion of component b5) here is from 0 to 15% by weight, preferably from 3 to 10% by weight, and that of b6) here is from 0 to 5% by weight, preferably from 0 to 4% by weight, and in particular 0% by weight, based in each case on the total weight of components b1) to b6). The quantity used of other compounds having groups reactive toward isocyanate, alongside components b1) to b6), is preferably less than 20% by weight, more preferably less than 10% by weight, particularly preferably less than 1% by weight, and in particular 0.

For the purposes of the present invention, functionality refers to actual functionality, which because of side reactions can be lower than theoretical functionality calculated from the functionality of the starter molecule. Determination methods for actual functionality are known: double bonds produced via elimination of water can by way of example be determined, for example by iodine titration.

Catalysts (c) greatly accelerate the reaction of the polyols (b) and in appropriate cases chain extenders and crosslinking agents (f), and also chemical blowing agents (e) with the organic, optionally modified polyisocyanates (a). Conventional catalysts for the production of the polyurethanes can be used here. Mention may be made by way of example of amidines, for example 2,3-dimethyl-3,4,5,6-tetrahydropyrimidine, tertiary amines, for example triethylamine, tributylamine, DBU, phenol-blocked DBU, dimethylbenzylamine, N-methyl-, N-ethyl-, or N-cyclohexylmorpholine, N,N,N'N-tetramethylethylenediamine, N,N,N'N-tetramethylbutanediamine, N,N,N'N-tetramethylheanediamine, pentamethyldiethylenetriamine, tetramethyldiaminoethyl ether, bis(dimethylaminopropyl)urea, dimethylpiperazine, 1,2-dimethylimidazole, 1-azabicyclo[3.3.0]octane, and preferably 1,4-diazabicyclo[2.2.2]octane, and alkanolamine compounds, for example triethanolamine, triisopropanolamine, N-methyl- and N-ethyldiethanolamine, and dimethylethanolamine. It is equally possible to use organometallic compounds, preferably organotin compounds, for example tin(II) salts of organic carboxylic acids, e.g. tin(II) acetate, tin(II) octanoate, tin(II) ethylhexanoate, and tin(II) laurate, and the dialkyltin(IV) salts of organic carboxylic acids, e.g. dibutyltin diacetate, dibutyltin dilaurate, dibutyltin maleate, and dioctyltin diacetate, and also bismuth carboxylates, for example bismuth (III) neodecanoate, bismuth 2-ethylhexanoate, and bismuth octanoate, or a mixture thereof. The organometallic compounds can be used alone or preferably in combination with strongly basic amines.

It is moreover possible to use known incorporable amine catalysts. These have at least one, preferably from 1 to 8, and particularly preferably from 1 to 2, groups reactive toward isocyanates, for example primary amine groups, secondary amine groups, hydroxy groups, amide groups, or urea groups. Incorporable amine catalysts are mostly used for the production of low-emission polyurethanes, these being in particular used in the automobile interior sector. These catalysts are known and are described by way of example in EP1888664. If the intention is to achieve a further reduction of emissions, catalysts (c) used are exclusively incorporable catalysts or mixtures of incorporable and non-incorporable catalysts.

When catalysts (c) are used, the concentration of these that can be used is by way of example from 0.001 to 5% by weight, in particular from 0.05 to 2% by weight, in the form of catalyst or catalyst combination, based on the weight of component (b).

Antioxidants and/or light stabilizers (d) that can be used are any antioxidants and light stabilizers known for polyurethane. These comprise hindered amine light stabilizers, known as HALS, which comprise one or more 2,2,6,6-tetramethylpiperidine units as structural unit. These compounds can be purchased by way of example with the trade names Uvinul® 5050 H, Uvinul® 4077 H, Tinuvin® 770, UV-77, JPT, Sabostab® UV 70, Sanol® LS-770, Adekastab® LA-77, HS-770, Uvinul® 4050 H, Uvinul® 4077 H, Tinuvin® 622, Sabostab® UV 62, Uvinul® 5062 H, Chisorb® 622, Tinuvin® 144, Tinuvin® 765, Tinuvin® 292, Tinuvin® 123, Tinuvin® 5100, Chimassorb® 119, Chimassorb® 944, Adekastab® LA-94, Sanol® LS 944, Tinuvin® 783, Mark LA52 FI, or Adekastab® LA-52. Compounds that can be used as light stabilizers, in particular to counter UV radiation, alongside hindered amines, have one or more of the general structural units selected from the group consisting of benzophenone, benzotriazole, cyanoacrylate, cinnamate, oxanilide, formamidine, triazine, and benzylidenemalonate. Examples of these compounds are obtainable with the trade names Uvinul® 3008, Chimassorb® 81, CH81 DRIED, Kemisorb® 12, Seesorb® 102, Adekastab® 1413, Adekastab® LA-51, Viosorb® 130, Uvinul® 3026, Tinuvin® 326, Tinogard® AS, Kemisorb® 73, Seesorb® 703, Adekastab® LA-36, Viosorb® 550, Sumisorb® 300, UV-730, Tomisorb® 600, Uvinul® 3027, Tinuvin® 327, Kemisorb® 72, Seesorb® 702, Adekastab® LA34, Viosorb® 580, UV-750, Tomisorb® 700, Uvinul® 3028, BLS 1328, Cyasorb® UV-2337, Tinuvin® 328, Kemisorb® 74, Seesorb® 704, Viosorb® 591, Sumisorb® 350, Uvinul® 3029, Tinuvin® 329, UV5411, Kemisorb® 79, Seesorb® 709, Viosorb® 583, Sumisorb® 340, Uvinul® 3033 P, BLS 1710, Kingsorb® 71, Tinuvin® P, Kemisorb® 71, Seesorb® 701, Adekastab® LA32, Viosorb® 520, Sumisorb® 200, UV-710, Tomisorb® 100, Uvinul® 3030, Uvinul® 3035, Uvinul® 3039, Uvinul® N 539 T, Uvinul® 3088, Tinosorb® OMC, Uvinul® MC 80 N, Tinuvin® 213, Eversorb® 80, Tinuvin® 234, Uvinul® 3034, Tinuvin® 900, Eversorb® 234, Seesorb® 706, Viosorb® 590, Sumisorb® 590, Tinuvin® 312, Sanduvor® VSU Powder, Tinuvin® 571, Tinuvin® 171, Tinogard® TL, Additive NX Tinubin® 571, Chisorb® 971, Tinuvin® 101, Zikasorb® R, Additive TS 3111, Cyasorb® 1164, Uvinul® 3000, Sanduvor® PR25, Hostavin® PR25, NEPA, Tinuvin® 384, Tinuvin® 99, Eversorb® 81, CGL 384 Distilled, Tinuvin® 1577, Tinuvin® 360, Tinosorb® MBBT, Lowilite® 36, Tinuvin® 320, Kemisorb® 75, Seesorb® 705, Adekastab® LA-38, Viosorb® 582, and Sumisorb® 320.

Compounds used as antioxidants are in particular those comprising one or more of the structural units selected form sterically hindered phenols, sulfides, and benzoates. In the case of sterically hindered phenols here, the two ortho-hydrogens have been replaced by moieties other than hydrogen which preferably bear from 1 to 20, particularly preferably from 3 to 15, carbon atoms, and which are preferably branched. It is also preferable that benzoates bear, in ortho-position to the OH group, substituents other than hydrogen which particularly preferably bear from 1 to 20, in particular from 3 to 15, carbon atoms, and which are preferably branched. Examples of these compounds are obtainable with the trade names Irganox® 245 FF, Irganox® 245, Songnox® 2450 FF, Irganox® 1010, Anox® 20, Betenox® 1010, Ashland® AO 610, BNX 1010, Dovernox® 10, Irganox® L 101, Songnox® 1010, Spül-IX 1010, Tinogard® TT, VX IX 1010 ED, VXDD IX 1010 ED, Adekastab® AO-60, Sumilizer® BP-101, Tominox® TT, Irganox® 1098, Plaox®-1098, Lowinox® HD98, Chinox® 1098, Tinuvin® 144, Irganox® 1135, CA 505, Irganox® L135, Irgastab® BD 50, KPA 2399, Lubad® 668, Naugalube® 531, Naugard® PS-48, OIC 135, OX BF, Stock 3074, Irganox® 1076, BNX 1076, Anox® PP 18, Naugard® 76, Tinogard® TS, Adekastab® AO-50, Sumilizer® BP-76, Tominox® SS, Irganox® 1425, Irgamod® 195, Antioxidant 1425, Irganox® 3114, Irganox® 1330, Ethanox® 330, Kingnox® 1330, Adekastab® AO-330, Irganox® 1081, Irganox® E201, tocopherylquinone, DL-alpha-tocopherol, Irganox® PS 800, Arenox® DL, dilauryl thiodipropionate (DLTDP), Irganox® PS 802, Arenox® DS, Cyanox® STDP-SP Powder, DSTP, Kingnox® DSTDP, Irganox® 565, Tinogard® MD1, Irganox® 1035, Irganox® L115, Irganox® 1520, Irgastab® cable KV 10, Irganox® 1726, Irganox® 3052, Irganox® MD 1024, Lowinox® MD24, Thanox® MD 1024, Irgastab® MBS 11, Irgastab® PVC 11, Irgastab® PVC 11 EM, Irgastab® PUR 55, Irgastab® PUR 67, Irgastab® PUR 68, Irganox® B 1171, Irganox® B 215, Irganox® B 225, Irganox® B 220, Irganox® B 561, Irganox® B 612, Tinuvin® XT 833, Yoshinox® SR, Irganox® 415, Lowinox® TBM, Sangonox® TBMC, Tinuvin® 120, Kemisorb® 112, Seesorb® 712, Adekastab® LA-12, Viosorb® 80, Sumisorb® 400, Adekastab® AO-40, Sumilizer® BBM-S, and Lowinox® 44625.

It is particularly preferable that the antioxidants and/or light stabilizers (d) used in the invention comprise at least one ester group or ether group, where there is a carbon atom neighboring the oxygen atoms of the ester group or ether group in the molecule of the antioxidant or of the light stabilizer. Examples here are Uvinul® 4077 H, Tinuvin®770, UV-77, JPT, Sabostab® UV 70, Sanol® LS-770, Adekastab® LA-77, HS-770, Uvinul® 3008, Chimassorb® 81, CH81 DRIED, Kemisorb® 12, Seesorb® 102, Adekastab® 1413, Adekastab® LA-51, Viosorb® 130, Uvinul® 3030, Uvinul® 3035, Uvinul® 3039, Uvinul® N 539 T, Uvinul® 3088, Tinosorb® OMC, Uvinul® MC 80 N, Irganox® 245 FF, Irganox® 245, Songnox® 2450 FF, Tinuvin®622, Sabostab® UV 62, Uvinul® 5062 H, Chisorb® 622, Tinuvin®213, Eversorb® 80, Tinuvin®312, Cyasorb® 1164, Sanduvor® PR25, Hostavin® PR25, NEPA, Irganox® 1010, Anox® 20, Betenox® 1010, Ashland® AO 610, BNX 1010, Dovernox® 10, Irganox® L 101, Songnox® 1010, Spül-IX 1010, Stock 4413, Tinogard® TT, VX IX 1010 ED, VXDD IX 1010 ED, Adekastab® AO-60, Sumilizer® BP-101, Tominox® TT, Tinuvin®144, Tinuvin®765, Tinuvin® 292, Irganox® 1135, CA 505, Irganox® L135, Irgastab® BD 50, KPA 2399, Lubad® 668, Naugalube® 531, Naugard® PS-48, OIC 135, OX BF, Stock 3074, Tinuvin®384, Tinuvin®99, Eversorb® 81, Irganox® 1076, BNX 1076, Anox® PP 18, Naugard® 76, Tinogard® TS, Adekastab® AO-50, Sumilizer BP-76, Tominox® SS, Tinuvin® 1577, Tinuvin®123, Tinuvin® 5100, Irganox® PS 800, Arenox® DL, Dilaurylthiodipropionat (DLTDP), Irganox® PS 802, Arenox® DS, Cyanox® STDP-SP Powder, DSTP, Kingnox® DSTDP, Irganox® 1035, Irganox® L115, Irganox® 3052, Irgastab® PUR 67, Irgastab® PUR 68, Mark LA52 FI, Adekastab® LA-52, Tinuvin®120, Kemisorb® 112, Seesorb® 712, Adekastab® LA-12, Viosorb® 80, and Sumisorb® 400.

The proportion of the compound (d), based on the total weight of components (a) to (f), is preferably more than 0.1% by weight, particularly preferably from 0.3 to 10% by weight, and in particular from 0.5 to 5% by weight.

When the polyurethane of the invention is intended to take the form of polyurethane foam, reaction mixtures of the invention also comprise blowing agents (e). It is possible here to use any of the blowing agents known for the production of polyurethanes. These can comprise chemical and/or physical blowing agents. These blowing agents are described by way of example in "Kunststoffhandbuch, Band 7, Polyurethane" [Plastics handbook, Volume 7, Polyurethanes], Carl Hanser-Verlag, 3rd edition 1993, chapter 3.4.5. The expression chemical blowing agents here means compounds which form gaseous products via reaction with isocyanate. Examples of these blowing agents are water and carboxylic acids. The expression physical blowing agents here means compounds which have been emulsified or dissolved in the starting materials for production of the polyurethane and which vaporize under the conditions of formation of the polyurethane. By way of example, these are hydrocarbons, halogenated hydrocarbons, and other compounds such as perfluorinated alkanes, for example perfluorohexane, fluorochlorocarbons, and ethers, esters, ketones, acetals, and/or liquid carbon dioxide. Any desired quantity of the blowing agent can be used here. The quantity used of the blowing agent is preferably such that the density of the resultant polyurethane foam is from 10 to 850 g/L, particularly from 20 to 800 g/L, and in particular from 25 to 500 g/L. Blowing agents used particularly preferably comprise water. It is preferable to use no blowing agents (e).

It is moreover possible to use auxiliaries and/or additional substances (f). It is possible here to use any of the auxiliaries and additional substances known for the production of polyurethanes. Mention may be made by way of example of surface-active substances, water scavengers, foam stabilizers, cell regulators, release agents, fillers, dyes, pigments, flame retardants, hydrolysis stabilizers, and fungistatic and bacteriostatic substances. These substances are known and are described by way of example in "Kunststoffhandbuch, Band 7, Polyurethane" [Plastics handbook, Volume 7, Polyurethanes], Carl Hanser-Verlag, 3rd edition 1993, chapters 3.4.4 and 3.4.6 to 3.4.11.

The quantities of the starting materials reacted in the production of the polyurethane gasket of the invention are generally such that the ratio of NCO groups of the polyisocyanates (a) to the entirety of the reactive hydrogen atoms of components (b) to (d) and in appropriate cases (e) and (f) is from 0.9 to 1.2:1, preferably from 0.95 to 1.15:1. A ratio of 1:1 here corresponds to an isocyanate index of 100.

The polyurethane gasket of the invention is preferably obtained via introduction of the reaction mixture into a mold which preferably comprises the article requiring sealing, and is particularly preferably obtained via spraying in an open mold onto the article requiring sealing. The spray process in an open mold here is described in EP 1577080. It is preferable that the polyurethane gasket of the invention is a gasket for transparent articles, for example glazing, examples being glass glazing systems or transparent synthetic polymer glazing systems such as Plexiglas, preferably glass glazing systems, in particular for windshields in automobile construction; the gasket is preferably produced by the spray process of EP 1577080. For the purposes of the invention, the mixture of components (a) to (e) here is termed reaction mixture when conversions in the reaction are smaller than 90%, based on the isocyanate groups.

In particular in the case of use in automobile construction, the polyurethane gasket of the invention comes into contact with constituents and degradation products of other polymers. This can occur via direct contact of the polyurethane gasket of the invention with the other polymer or else via transfer of the polymer constituents, for example through the air. It is preferable that the polyurethane gasket of the invention is in direct contact with the other polymer.

Problematic polymers here are in particular those having high content of emittable substances, examples being unvulcanized rubbers, in particular unvulcanized synthetic rubbers, and the rubbers obtainable by vulcanization thereof. The expression unvulcanized rubber here means uncrosslinked polymers which can, however, be crosslinked via vulcanization, with elastomeric properties at 20° C. Unvulcanized rubbers exhibit viscous flow at relatively high temperatures and/or on exposure to deforming forces. A precondition for the crosslinkability of the unvulcanized rubbers is the presence of functional groups, in particular of unsaturated carbon-carbon bonds, by way of which molecules of unvulcanized rubber are linked intermolecularly to one another in a process termed vulcanization. Examples of rubbers are styrene-butadiene rubbers (SBR), ethylene-propylene terpolymer rubbers (EPTR), nitrile rubbers (NBR), and polychloroprenes (CR). In one particularly preferred embodiment the other polymer is ethylene-propylene diene terpolymer and, respectively, the rubber obtainable via vulcanization thereof. It is preferable here to use unconjugated dienes as diene component; only one double bond of these takes part in the formation of the polymer chain, and other double bonds therefore remain outside of the main chain structure. This can be vulcanized with sulfur. It is particularly preferable that the content of the diene component is from 2 to 12% by weight, based on the total weight of the ethylene, propylene, and diene component.

Examples are used below to illustrate the present invention.

Starting Materials:

Polyol 1: polyetherol based on ethylene oxide and propylene oxide with glycerol as starter, with OH number 35 mg KOH/g, with ethylene oxide content 13% by weight, and with propylene oxide content 85% by weight, based on total weight, and with functionality 2.7.

Polyol 2: polyol based on dehydrated castor oil with OH number 124 mg KOH/g and with functionality 2.2.

Polyol 3: castor oil.

Polyol 4: polyesterol based on adipic acid and monoethylene glycol, and also diethylene glycol, with MEG content 31% by weight and with diethylene glycol content 21% by weight, based on total weight. The OH number of the polyesterol is 56 mg KOH/g and its functionality is 2.0.

Fatty acid ester: aliphatic fatty acid ester based on glycerol with functionality 0.0.

Polyetheramine: linear polypropylene glycol having terminal amino functions, with amine number 56.7 mg KOH/g and with functionality 2.0.

Crosslinking agent: polyetherol based on ethylene oxide with 1,1,1-trimethylolpropane as starter, with OH number 935 mg KOH/g, with ethylene oxide content 23% by weight, based on total weight, and with functionality 3.0.

MEG: monoethylene glycol

DEA: diethanolamine

Catalyst 1: amine catalyst based on an annellated amidine structure.

Catalyst 2: mixture of 35% by weight of phenol, 55% by weight of catalyst 1, and 10% by weight of diethylene glycol.

Catalyst 3: dimethyltin dineodecanoate

Stabilizer 1: ethylenebis(oxyethylene) bis[3-(5-tert-butyl-4-hydroxy-m-tolyl)propionate] (Irganox® 245)

Stabilizer 2: 2-(2H-benzotriazol-2-yl)-4,6-di-tert-pentyl-phenol (Tinuvin® 328)

Black paste: dispersion of 50% by weight of carbon black in polyol 1.

Isocyanate: Mixture of monomeric isophorone diisocyanate and trimeric isocyanurates based on isophorone diisocyanate with 29.1% NCO content in the mixture.

TNPP: trisnonylphenyl phosphite

Stabilizer 3: bis(1,2,2,6,6-pentamethyl-4-piperidyl) sebacate

A mixture 1 was produced via mixing of the components listed in table 1.

TABLE 1

Composition of mixture 1 in percent by weight

| | Comp. ex. 1 | Inv. ex. 1 | Inv. ex. 2 | Comp. ex. 2 | Inv. ex. 3 | Comp. ex. 3 |
|---|---|---|---|---|---|---|
| Polyol 1 | 74.84 | 64.84 | 64.84 | 64.84 | 66.59 | 68.04 |
| Polyol 2 | 0.00 | 10.00 | 0.00 | 0.00 | 10.00 | 0.00 |
| Polyol 3 | 0.00 | 0.00 | 10.00 | 0.00 | 0.00 | 0.00 |
| Polyol 4 | 0.00 | 0.00 | 0.00 | 10.00 | 0.00 | 0.00 |
| Fatty acid ester | 0.00 | 0.00 | 0.00 | 0.00 | 0.00 | 9.09 |
| Polyetheramine | 6.00 | 6.00 | 6.00 | 6.00 | 6.00 | 5.46 |
| Crosslinking agent | 2.50 | 2.50 | 2.50 | 2.50 | 1.25 | 2.27 |
| MEG | 5.70 | 5.70 | 5.70 | 5.70 | 5.20 | 5.18 |
| DEA | 3.30 | 3.30 | 3.30 | 3.30 | 3.30 | 3.00 |
| Catalyst 1 | 0.48 | 0.48 | 0.48 | 0.48 | 0.48 | 0.44 |
| Catalyst 2 | 0.48 | 0.48 | 0.48 | 0.48 | 0.48 | 0.44 |
| Stabilizer 1 | 0.95 | 0.95 | 0.95 | 0.95 | 0.95 | 0.86 |
| Stabilizer 2 | 0.95 | 0.95 | 0.95 | 0.95 | 0.95 | 0.86 |
| Black paste | 4.80 | 4.80 | 4.80 | 4.80 | 4.80 | 4.36 |

A mixture 2 is produced via mixing of the components listed in table 2.

TABLE 2

Composition of mixture 2 in percent by weight

| | Comp. ex. 1 | Inv. ex. 1 | Inv. ex. 2 | Comp. ex. 2 | Inv. ex. 3 | Comp. ex. 3 |
|---|---|---|---|---|---|---|
| Isocyanate | 88.20 | 88.20 | 88.20 | 88.20 | 88.20 | 88.20 |
| Catalyst 3 | 1.50 | 1.50 | 1.50 | 1.50 | 1.50 | 1.50 |
| TNPP | 8.60 | 8.60 | 8.60 | 8.60 | 8.60 | 8.60 |
| Stabilizer 3 | 1.70 | 1.70 | 1.70 | 1.70 | 1.70 | 1.70 |

Manual Experiments:

Mixture 1 was mixed with mixture 2, the isocyanate index being 100, and the material was charged to a closed mold to give moldings.

Machine Experiments:

In a standard high-pressure RIM process, a compact test sample with maximum surface smoothness, thickness 4 mm, and width 4 cm is produced via mixing of mixtures 1 and 2 with an isocyanate index of 100. This process is described by way of example in "Kunststoffhandbuch, 7, Polyurethane" [Plastics handbook, 7, Polyurethanes], Carl Hanser-Verlag, 3rd edition 1993, chapter 4.2.

On this test sample, a test sample made of EPDM with thickness 2 mm is secured centrally by mechanical clamping, care being taken here to achieve full contact between EPDM and polyurethane without any gaps. The width of the EPDM strip is 1 cm, and there is therefore a residual uncovered polyurethane surface measuring 1.5 cm on both the left-hand and the right-hand side.

The EPDM (ethylene-propylene-diene)-monomer elastomer used is a compact, deep-black-colored, plasticized sealing material used in the automobile industry, with from 30 to 40% by weight content of naphtha-based plasticizers. The test sample is subjected to artificial aging for 2500 h in accordance with ASTM G155, cycle 7; the side of the test sample oriented toward the source of light/weathering here is that with the mechanically secure EPDM strip. Any cracking that may occur, caused by plasticizer migration and UV-weathering, is observed on the polyurethane surface alongside the EPDM on the left-hand and right-hand sides.

Sheets from the standard high-pressure RIM process from the machine experiments were likewise used prior to weathering for determination of Shore hardness values in accordance with DIN 53505.

Results:

| Property | Comp. ex. 1 | Inv. ex. 1 | Inv. ex. 2 | Comp. ex. 2 | Inv. ex. 3 | Comp. ex. 3 |
|---|---|---|---|---|---|---|
| Shore A hardness in Accordance with DIN 53505 | 85 | 88 | 88 | 86 | 77 | 76 |
| Cracking | yes | no | n.d. | yes | no | yes |

The invention claimed is:

1. A process for the production of polyurethane gaskets, the process comprising:
   mixing:
   (a) aliphatic polyisocyanate,
   (b) compounds having at least two groups reactive toward isocyanates,
   (c) catalysts, and
   at least one of antioxidants and light stabilizers
   to give a reaction mixture, and
   allowing completion of the reaction mixture to give the polyurethane,
   wherein the Shore A hardness of the polyurethane gasket is less than 90, the density of the polyurethane gasket is at least 850 g/L, and the compounds having at least two groups reactive toward isocyanate comprise b1) polyetherols with functionality from 2 to 4 and with hydroxy number from 20 to 100 mg KOH/g, b2) hydrophobic polyols with OH number smaller than 180 mg KOH/g and with functionality from greater than 2 to 3, b3) chain extenders, and b5) a compound with molar mass from 800 to 6000 g/mol and with average functionality from 2 to 4 and, as groups having functionality toward isocyanate, functional groups selected from the group consisting of $-NH_2$, $-NH-$, and $-OH$ groups, wherein at least one of the functional group is an $NH_2$ group.

2. The process according to claim 1, wherein the aliphatic polyisocyanate (a) comprises a mixture of monomeric and trimeric isophorone diisocyanate.

3. The process according to claim 1, wherein the hydroxy number of the polyetherol b1) is from 25 to 50 mg KOH/g.

4. The process according to claim 1, wherein the polyetherol b1) has, as alkylene oxide, ethylene oxide units and propylene oxide units, wherein the proportion of ethylene oxide units, based on the total weight of alkylene oxide units in the polyether polyol b1), is smaller than 30% by weight, and the proportion of primary OH groups is greater than 70%, based on the number of OH groups in the polyether polyol b1).

5. The process according to claim 1, wherein the hydrophobic polyol b2) comprises at least one of castor oil, dehydrated castor oil, and alkoxylation products of castor oil or of dehydrated castor oil.

6. The process according to claim 1, wherein the hydrophobic polyol b2) comprises a partially dehydrated castor oil.

7. The process according to claim 1, wherein the chain extender b3) has aliphatically bonded OH groups, and its molar mass is less than 160 g/mol.

8. The process according to claim 1, wherein the compounds (b) having at least two groups reactive toward isocyanates further comprise, alongside the compounds b1) to b3), a compound b4) with molar mass smaller than 150 g/mol and with average functionality from 2 to 3 and, as groups having functionality toward isocyanate, functional groups selected from the group consisting of —NH$_2$, —NH—, and —OH groups, wherein at least one of the functional groups is an —NH$_2$ group or an —NH— group.

9. A process for the production of polyurethane gaskets, the process comprising:
mixing:
(a) aliphatic polyisocyanate,
(b) compounds having at least two groups reactive toward isocyanates,
(c) catalysts, and
at least one of antioxidants and light stabilizers
to give a reaction mixture, and
allowing completion of the reaction mixture to give the polyurethane,
wherein the Shore A hardness of the polyurethane gasket is less than 90, the density of the polyurethane gasket is at least 850 g/L, and the compounds having at least two groups reactive toward isocyanate comprise b1) polyetherols with functionality from 2 to 4 and with hydroxy number from 20 to 100 mg KOH/g, b2) hydrophobic polyols with OH number smaller than 180 mg KOH/g and with functionality from greater than 2 to 3, b3) chain extenders, a compound b4) with molar mass smaller than 150 g/mol and with average functionality from 2 to 3 and, as groups having functionality toward isocyanate, functional groups selected from the group consisting of —NH$_2$, —NH—, and —OH groups, wherein at least one of the functional groups is an —NH$_2$ group or an —NH— group, and a compound b5) with molar mass from 800 to 6000 g/mol and with average functionality from 2 to 4 and, as groups having functionality toward isocyanate, functional groups selected from the group consisting of —NH$_2$, —NH—, and —OH groups, wherein at least one of the functional group is an NH$_2$ group.

10. The process according to claim 9, wherein the compounds (b) having at least two groups reactive toward isocyanates further comprise, alongside the compounds b1) to b5), a compound b6) with molar mass smaller than 400 g/mol and with hydroxy functionality from 3 to 6.

11. The process according to claim 1, wherein catalysts are exclusively amine catalysts.

12. The process according to claim 10, wherein, based on the total weight of components b1) to b6), the proportion of component b1) is from 50 to 90% by weight, the proportion of component b2) is from 5 to 25% by weight, the proportion of component b3) is from 1 to 7% by weight, the proportion of component b4) is from 1 to 5% by weight, the proportion of component b5) is from 3 to 10% by weight, and the proportion of component b6) is from 0 to 5% by weight.

13. The process according to claim 1, further comprising mixing
(e) blowing agents, and
(f) auxiliaries and/or additional substances
to give the reaction mixture.

14. A polyurethane gasket obtainable by a process according claim 1.

15. The process according to claim 13, wherein the ratio in which components (a) to (f) are mixed is such that the isocyanate index is from 90 to 120.

* * * * *